United States Patent
Hamed et al.

(10) Patent No.: US 9,828,725 B1
(45) Date of Patent: Nov. 28, 2017

(54) SPECIALTY PULP WITH HIGH INTRINSIC VISCOSITY

(71) Applicant: Rayonier Performance Fibers, LLC., Jacksonville, FL (US)

(72) Inventors: Othman A. Hamed, Savannah, GA (US); Romuald Krzywanski, Richmond Hill, GA (US)

(73) Assignee: RAYONIER PERFORMANCE FIBERS, LLC, Jacksonville, FL (US)

(*) Notice: Subject to any disclaimer, the term of this patent is extended or adjusted under 35 U.S.C. 154(b) by 0 days.

(21) Appl. No.: 15/353,390

(22) Filed: Nov. 16, 2016

(51) Int. Cl.
*D21C 9/00* (2006.01)

(52) U.S. Cl.
CPC .......... *D21C 9/004* (2013.01); *D21C 9/005* (2013.01)

(58) Field of Classification Search
CPC ......... D21C 9/002; D21C 9/004; D21C 9/005
See application file for complete search history.

(56) References Cited

U.S. PATENT DOCUMENTS

| | | | | |
|---|---|---|---|---|
| 5,854,146 A * | 12/1998 | Itoyama | ........... | D06M 13/11 427/392 |
| 2003/0230391 A1* | 12/2003 | Hamed | ........... | A61F 13/15203 162/157.6 |
| 2004/0234760 A1* | 11/2004 | Hamed | ........... | A61L 15/60 428/375 |
| 2008/0082064 A1* | 4/2008 | Luo | ........... | A61F 13/53 604/367 |
| 2014/0073777 A1* | 3/2014 | Miyoshi | ........... | C08B 1/08 536/96 |

FOREIGN PATENT DOCUMENTS

| JP | 2003342875 A | * 12/2003 |
|---|---|---|
| JP | 2004154165 | 6/2004 |

OTHER PUBLICATIONS

Liu et al., High Permeability Filter Paper Prepared from Pulp Fiber Treated in NaOH/Urea/Thiourea System at low Temperature, 2015, BioResources, vol. 10, No. 3.*
Smook, Handbook for Pulp and Paper Technologists, 1992, Angus Wilde Publications, 2nd edition, chapters 1, 2, 9, and 15.*
Haroham, A new Cotton Fiber Paper Furnish, 1949, ASTM International.*
Dupont, Anne-Laurence et al., "Comparative Evaluation of Size-Exclusion Chromatography and Viscometry for the Characterisation of Cellulose," Journal of Chromatography A (2004) 1026(1): 129-141.

* cited by examiner

*Primary Examiner* — Anthony Calandra
(74) *Attorney, Agent, or Firm* — Wenderoth, Lind & Ponack, L.L.P.

(57) ABSTRACT

A method for making a specialty fiber by activating pulp in an alkaline aqueous medium, then reacting it a water-soluble, multi-functional reagent able to bridge neighboring cellulose chain within a single fiber. The resultant specialty cellulose fibers have high intrinsic viscosity and may be used to make cellulose ethers, cellulose acetate, and viscose.

28 Claims, 4 Drawing Sheets

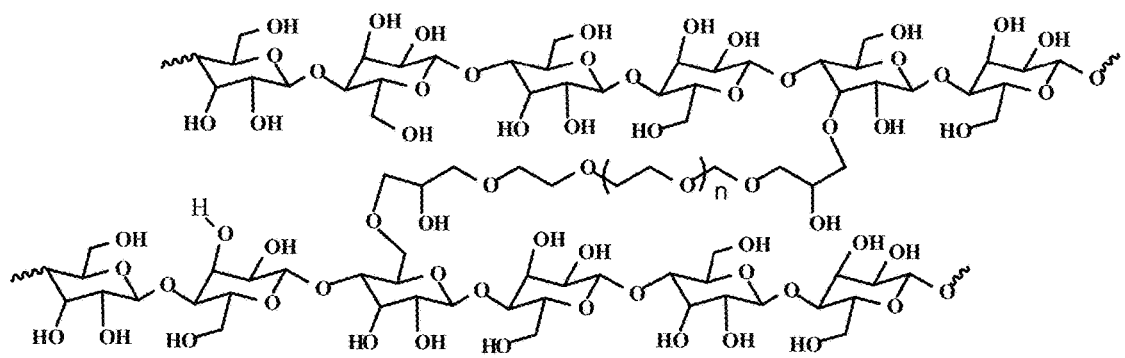
2A
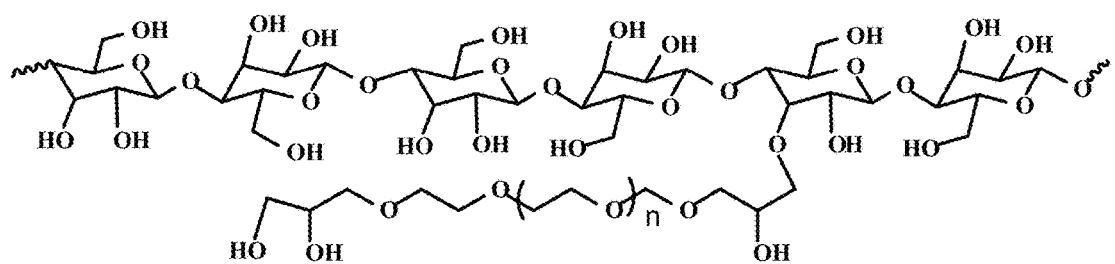
2B
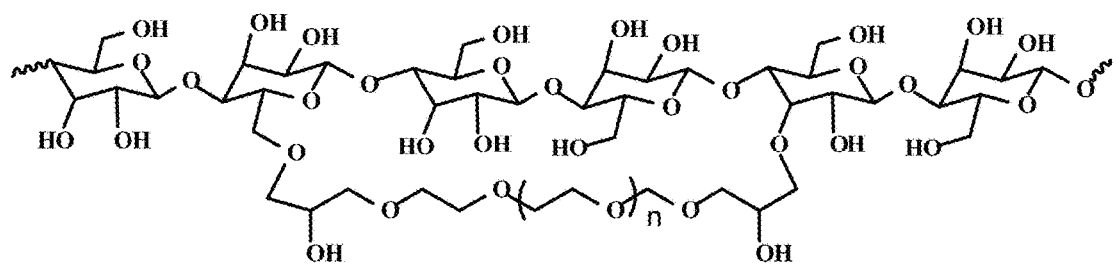
2C
FIGURE 2A-C

Fig. 4A
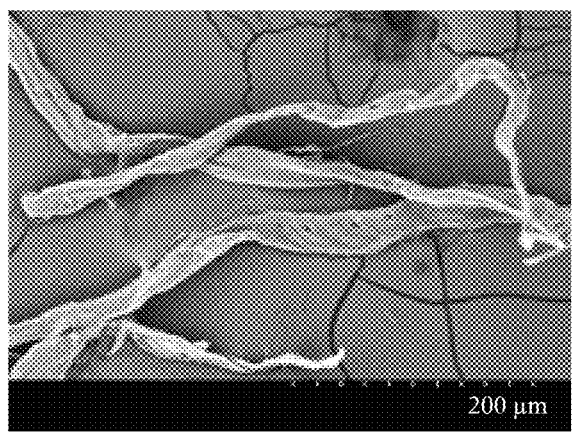
Fig. 4B
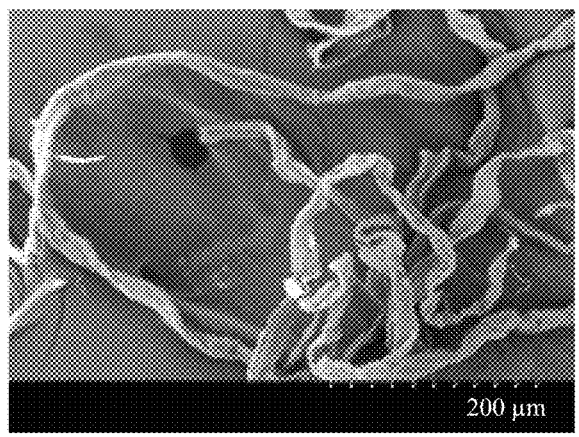
Fig. 4C
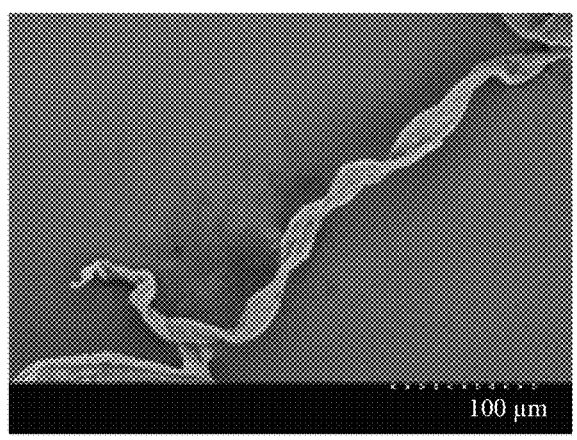
FIGURE 4

SPECIALTY PULP WITH HIGH INTRINSIC VISCOSITY

BACKGROUND OF THE INVENTION

Field of the Invention

The present invention relates to methods of making specialty pulp having high intrinsic viscosity, suitable for use in making value-added polymers such as cellulose ether, cellulose acetate, and viscose.

Description of the Related Art

Cellulose is a naturally occurring linear homopolymer that exists in a fibrous form in plants. Chemically, it consists of the anhydroglucose repeat units connected through 1,4-β-glycosidic linkages. Each anhydroglucose unit has three hydroxyl groups—two secondary and one primary. The hydroxyl groups react with various electrophiles to form a wide range of cellulosic derivatives with specific commercial applications. For instance, the hydroxyl groups can be reacted with the etherifying agents after activation with an alkaline reagent to form cellulose ethers and with anhydrides or acid chlorides to form cellulose esters. Inorganic cellulose esters are also known. They are usually prepared from reacting cellulose with mineral acids such as nitric acid to form cellulose nitrate and with sulfuric acid to produce cellulose sulfonate.

During the last decades there has been a substantial increase of interest in specialty pulp with high molecular weight (high intrinsic viscosity) for cellulose ether applications. Cotton linters are the main source of making cellulose ether with high viscosity (high molecular weight cellulose ether). Cotton linters are considered the purest natural form of cellulose by persons working in the field. Cotton linters consist of over 98 wt. % α-cellulose. However, due to its high cost and limited supply, cotton linter pulp has to be supplemented by other pulp in manufacturing of cellulose derivatives.

Japan Patent Application Publication Number JP 2004154165 describes another approach for making cellulose ether. This patent application discloses grinding pulp and uses a combination of polyglycidyl ether crosslinking agent and etherifying agents in a single-step process; e.g., crosslinking during the etherification process. In Japan Patent Application Publication Number JP 2004154165, a low level of cross-linking is required; e.g., low viscosity, because it is a process of manufacturing a fire-retardant material and high viscosity is undesirable. Further, this publication fails to disclose any information about using pulp that is cross-linked with a polyglycidyl ether crosslinking agent prior to the etherification process.

Cellulose extracted from wood pulp is the main raw material used to manufacture cellulose derivatives due to its availability at low cost. Other non-wood pulps, like bamboo, have limited use. Wood contains very high molecular weight cellulose in addition to other chemicals that are present at high concentrations. During the isolation and purification of cellulose from wood chips, significant molecular weight loss of the cellulose occurs, depending on the process conditions used to isolate the cellulose. In addition, due to the oxidation caused by bleaching chemicals, undesirable functional groups, such as carboxyl or carbonyl groups, are formed on the cellulose backbone which affect cellulose reactivity and polydispersity. Another drawback of purifying cellulose extracted from wood chips is that the crystallinity and morphology of the cellulose fibers change, leading to changes in the accessibility of the hydroxyl groups present in the cellulose repeat units, which can affect their reactivity with the derivatizing agent.

A need exists in the art for specialty pulp with high intrinsic viscosity for making cellulose derivatives with high intrinsic viscosity and high purity.

BRIEF SUMMARY OF THE INVENTION

A method of making the specialty pulp with high intrinsic viscosity may comprise (a) an activation step comprising contacting pulp with an aqueous of alkaline hydroxide to form alkali cellulose; and (b) a bridging step comprising reacting the alkali cellulose with a bridging agent.

In one embodiment, the pulp may be a conventional pulp. The conventional pulp may be derived from hardwood cellulose pulp, softwood cellulose pulp, cotton linters, bagasse, kemp, flax, grass, or mixtures thereof. The pulp may be hardwood cellulose pulp. The hardwood cellulose pulp may be gum, maple, oak, *eucalyptus*, poplar, beech, aspen, or a mixture thereof. The pulp may be softwood cellulose pulp or hardwood cellulose pulp. The pulp may be softwood cellulose pulp. The softwood cellulose pulp may be Southern pine, White pine, Caribbean pine, Western hemlock, spruce, Douglas fir, or mixtures thereof. The softwood cellulose pulp may be Southern pine.

In any embodiment, the pulp may be obtained by a chemical, chemithermomechanical, thermomechanical, or mechanical process. The process may be a chemical process. The chemical process may be a Kraft, sulfite, or semichemical process.

In any embodiment, the method may further comprise bleaching.

In the embodiments of this invention, the pulp may be in a sheet form, roll pulp form, mat form, or fluff form. The pulp may be provided in a dry or wet state. The pulp may be in a dry state or never-dried state. The pulp may be in a never-dried state. The pulp may have a moisture content of not higher than 12%. The pulp may have a moisture content of not higher than 5%, 6%, 7%, 8%, 9%, 10%, 11%, or 12%.

In the embodiments of this invention, the pulp in step (a) may be at a consistency of about 2.0 wt % to 16 wt %. The pulp in step (a) may be at a consistency of about 1%, 2%, 3%, 4%, 5%, 6%, 7%, or 8%. The pulp in step (a) may be at a consistency of about 4%.

In the embodiments of this invention, the alkaline hydroxide may be sodium hydroxide (NaOH), lithium hydroxide (LiOH), potassium hydroxide (KOH), rubidium hydroxide (RbOH), benzyltrimethylammonium hydroxide (BTMOH), or mixtures thereof. The alkaline hydroxide may be sodium hydroxide (NaOH).

In the embodiments of this invention, the alkaline hydroxide may be provided in a solid form or a solution form. The alkaline hydroxide may be provided in a solution form. The alkaline hydroxide solution may comprise about 2 to 50 wt % of alkaline hydroxide. The alkaline hydroxide solution may comprise about 2 to 20 wt % of alkaline hydroxide. The alkaline hydroxide solution may comprise about 2 to 16 wt % of alkaline hydroxide. The alkaline hydroxide solution may comprise about 8 wt % of alkaline hydroxide. The alkaline hydroxide may be a 50% sodium hydroxide solution.

In the embodiments of this invention, the aqueous solution may further comprise a wedging agent at a concentration of about 2 to 100% by weight relative to the amount of alkaline hydroxide. The wedge agent may be at a concentration of about 3% to about 25% by weight of the pulp. The wedge agent may be at a concentration of about 1% to about 10%, 2% to 10%, 4% to 8%, or 5% to 7% by weight of the pulp. The wedge agent may be at a concentration of about 4% to 8% by weight of the pulp. The wedge agent may be at a concentration of about 6% by weight of the pulp. The wedging agent may be urea, thiourea, or a mixture thereof. The wedging agent may be urea.

In the embodiments of the invention, step (a) may be for 1 minute to 150 minutes. step (a) may be for 6 minutes to 4 hours, 1 to 2 hours, 12 minutes to 2 hours, 30 minutes to 3 hours, or 45 minutes to 2 hours.

In the embodiments of the invention, step (a) may be at a temperature of about −5° C. to 70° C. The temperature may be in the range of about 10° C. to 50° C., 20° C. to 40° C., 15° C. to 60° C., or 20° C. to 40° C. The temperature may be at a temperature of about 5° C., 10° C., 15° C., 20° C., 22° C., 25° C., 30° C., 35° C., 38° C., 39° C., 40° C., 45° C., 50° C., 55° C., 60° C., 65° C., or 70° C.

In the embodiments of the invention, the bridging agent may be an organic polyfunctional capped with at least two epoxy groups. The bridging agent may be a polyglycidyl ether. The bridging agent may be polyethylene glycol diglycidyl ether, diglycidyl ether, ethylene glycol diglycidyl ether, or a mixture thereof. The polyglycidyl ether may be diglycidyl ether; ethylene glycol diglycidyl ether; glycerol triglycidyl ether; glycerol diglycidyl ether; glycerol propoxylate triglycidyl ether; 1,2-Propanediol diglycidyl ether; 1,4-Butanediyl diglycidyl ether; polyethylene glycol diglycidyl ether; propylene glycol glycidyl ether; polypropylene glycol diglycidyl ether; 1,4-cyclohexanoldimethanol diglycidyl ether; trimethylolethane triglycidyl ether; 1,2-cyclohexanoldimethanol diglycidyl ether diglycidyl, diglycidyl 1,2-cyclohexanedicarboxylate; resorcinol diglycidyl ether; Poly[(2-oxiranyl)-1,2-cyclohexanediol]-2-ethyl-2-(hydroxymethyl)-1,3-propanediol ether; 3,4-epoxycyclohexylmethyl-3,4-epoxycyclohexanecarboxylate; 4,4'-Methylenebis(N,N-diglycidylaniline); N,N-diglycidyl aniline, tris(4-hydroxyphenyl)methane triglycidyl ether; N,N-diglycidyl-4-glycidyloxyaniline; diglycidyl 1,2,3,4-tetrahydrophthalate, 4,5-epoxycyclohexane-1,2-dicarboxylic acid diglycidyl ester, or a mixture thereof.

In the embodiments of the invention, the polyglycidyl ethers may contain two glycidyl ether groups. The polyglycidyl ether may contain two glycidyl ether groups in diglycidyl ether; ethylene glycol diglycidyl ether; 1,2-Propanediol diglycidyl ether; 1,4-Butanediyl diglycidyl ether; polyethylene glycol diglycidyl ether; propylene glycol glycidyl ether; polypropylene glycol diglycidyl ether; 1,4-cyclohexanoldimethanol diglycidyl; 1,2-cyclohexanoldimethanol diglycidyl ether diglycidyl, or a mixture thereof.

In the embodiments of the invention, the bridging agent may be a polyglycol-based diglycidyl ether. The polyglycol-based diglycidyl ether may be polyethylene glycol diglycidyl ether, ethylene glycol diglycidyl ether, polypropylene glycol diglycidyl ether, or a combination thereof. The polyglycol-based diglycidyl ether may be water soluble. The water soluble polyglycol-based diglycidyl ether may be polyethylene glycol diglycidyl ether, ethylene glycol diglycidyl ether, or a combination thereof.

In the embodiments of the invention, the bridging agent may be added to the pulp in an amount of 0.1% to 20% based on the pulp weight. The bridging agent may be added to the pulp in an amount of 1%, 5%, 10%, 12%, 14%, 16%, 18%, or 20% based on the pulp weight.

In the embodiments of the invention, the bridging agent may be added to the pulp in amount effective for bridging 0.2% to 10% by weight of dihydroxyalkoxy polyethylene glycol group on the pulp.

In any of the foregoing embodiments, step (b) may be at a temperature range of 30° C. to 80° C. The temperature range may be about 40° C. to 70° C., 40° C. to 65° C., 35° C. to 75° C., 50° C. to 80° C., or 40° C. to 60° C. The temperature may be about 50° C.

In any of the foregoing embodiments, step (b) may be for about 2 minutes to 6 hours. Step (b) may be for about 2, 3, 5, 10, 15, 20, 30, 45, or 50 minutes. Step (b) may be for about 1, 2, 3, 4, 5, or 6 hours. Step (b) may be for about 3 minutes to 4 hours. Step (b) may be conducted for about 10-80 minutes, 20-60 minutes, 15-75 minutes, or 20-80 minutes. Step (b) may be for about 20 to 60 minutes.

Step (b) may be conducted at atmospheric pressure (1 ATM). Step (b) may be conducted at a pressure from about 1 psi to about 150 psi.

Step (b) may be conducted using an atmosphere comprising an inert gas. The inert gas may be nitrogen, argon, helium, or neon. The inert gas may be nitrogen. The atmosphere may comprise at least 80% of the gas. The atmosphere may comprise at least 80% nitrogen.

The method may further comprise recovering the specialty pulp after the bridging step.

The specialty pulp may be recovered by centrifugation or suction filtration.

The method may further comprise washing the specialty pulp.

The method may further comprise adding an acid solution to neutralize the specialty pulp to a pH from 3 to 12. The pH may be 3 to 9. The acid may be hydrochloric acid, sulfur trioxide, sulfuric acid, or acetic acid. The acid may be sulfur trioxide. The acid solution may be 10%, 12%, 15%, 17%, 20%, 24%, or 25% acid by weight.

The method may further comprise drying the specialty pulp. The specialty pulp may be dried to a water content of not more than 20% by weight of the specialty pulp. The specialty pulp may be dried to a water content of not more than 1%, 2%, 3%, 4%, 5%, 6%, 7%, 8%, 9%, 10%, 11%, 12%, 13%, 14%, 15%, 16%, 17%, 18%, 19%, or 20% by weight of the specialty pulp.

The bridging stage may be conducted for 3 minutes to 120 minutes at a temperature range of 30° C. to 90° C.

The activation step (a) and/or bridging step (b) may be performed in one reaction vessel or in two separate and distinct reaction vessels.

Specialty pulp with high intrinsic viscosity prepared by the method comprising (a) an activation step comprising contacting pulp with an aqueous solution of alkaline hydroxide to form alkali cellulose; and (b) a bridging step comprising reacting the alkali cellulose with a bridging agent. The pulp may have an intrinsic viscosity of more than 1.2 times the intrinsic viscosity of the starting pulp.

The foregoing and other objects and aspects of the present invention are explained in greater detail in reference to the description set forth herein. It will be understood that the foregoing and following descriptions of objects and embodiments of the invention are provided to explain possible exemplary embodiments of the invention, and are not intended to define or limit the scope of the claims.

BRIEF DESCRIPTION OF THE DRAWINGS

FIG. 2A-C depicts dihydroxyalkoxy polyethylene glycol bonded to cellulose bonded from two sides to two cellulose chains (2A); bonded from one side (2B); and bonded to the same cellulose chain (2C).

FIG. 4 depicts SEM images at 250× of control Ethenier-HV (E-HV) (FIG. 4A) and specialty pulp SP1 (FIG. 4B) and SP2 (FIG. 4C).

DETAILED DESCRIPTION OF EXEMPLARY EMBODIMENTS

Definitions

Figure 1:
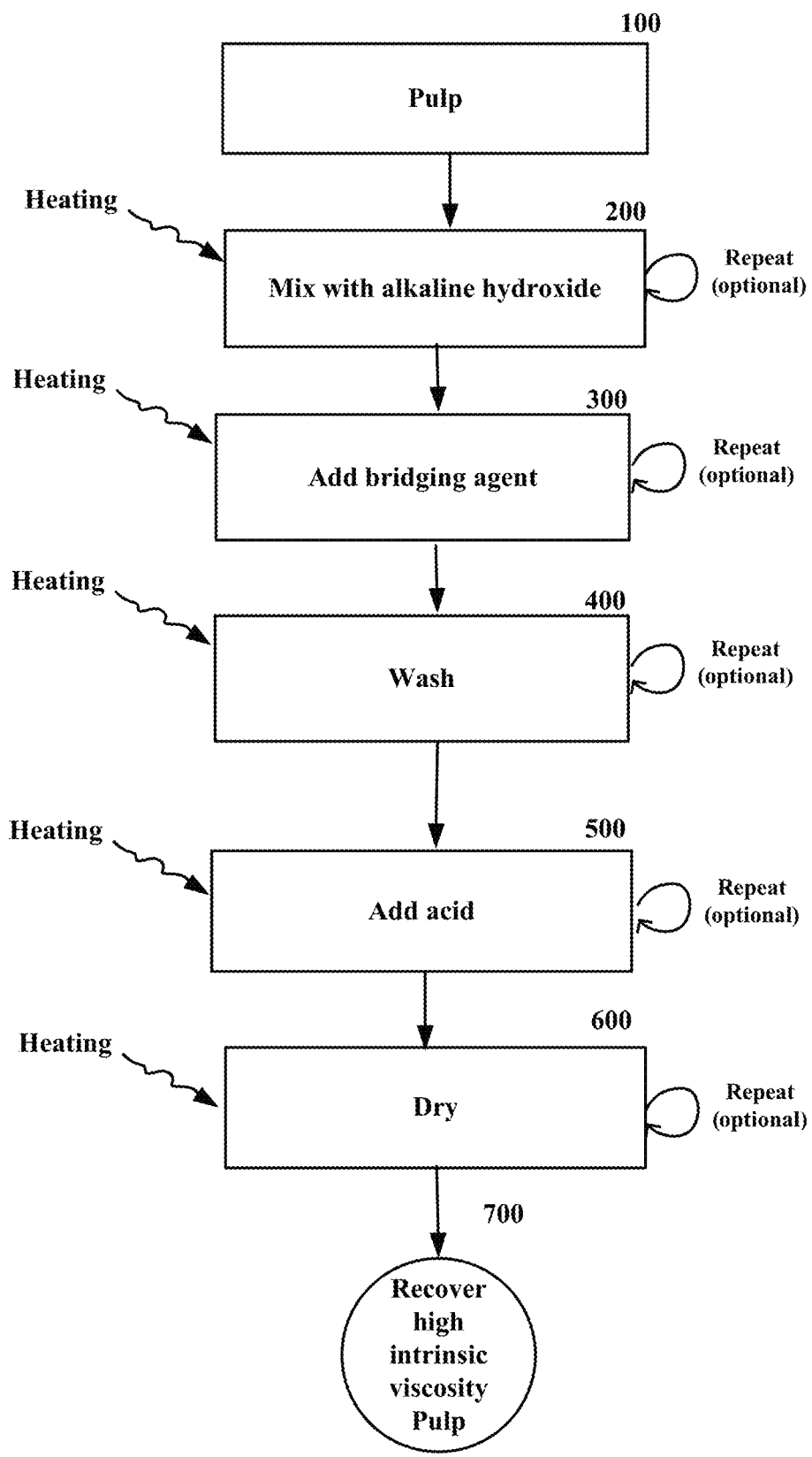
FIG. 1 depicts an exemplary flow-chart of the invention.

"About," as used herein, refers broadly to a range of plus or minus 5% of the stated value; e.g., time, temperature, weight.

"Consistency," as used herein, refers broadly to the concentration of cellulosic fibers in a mixture. As such, the consistency represents the weight of cellulosic fibers present in a mixture divided by the total weight of the mixture multiplied by 100. "Consistency" can be expressed in terms of a "weight percent."

"Turbidity," as used herein, refers broadly to the weight % of insolubles in an aqueous solution of cellulose ether. Turbidity is typically measured optically.

High Intrinsic Viscosity Pulp

The invention provides for a method of making pulp with high intrinsic viscosity (IV), i.e., high intrinsic viscosity pulp, or specialty pulp, by activating pulp in an alkaline aqueous medium, then reacting it with a water-soluble, multi-functional reagent able to bridge neighboring cellulose chains within a single fiber. This satisfies a long-felt need in the art for pulps with high intrinsic viscosity that offers the advantages afforded by cotton linter. The methods described herein provide cellulosic pulps with high intrinsic viscosity made from wood pulp, whereby the fibers provide wood pulps with viscosity and rheological properties comparable to those prepared from cotton linter. Indeed, there is a particular need in the art for cellulosic pulp with high intrinsic viscosity for use in making cellulose ether with high viscosity and rheological properties similar to those for cellulose ether obtained from wood pulp. For example, the methods described herein produce cellulosic pulp with high intrinsic viscosity that is at least 1.2 times higher than the starting pulp. The methods described herein produce cellulosic pulp with high intrinsic viscosity that is at least 1.5, 1.75, or 2.0 times higher than the starting pulp The methods described herein provide a simple, convenient, and inexpensive method for making cellulosic pulps with high intrinsic viscosity. Furthermore, the cellulosic pulp with high intrinsic viscosity may be used to produce cellulose ether with superior gel properties regarding clarity and color.

Methods of Making Pulp with High Intrinsic Viscosity

A method of making cellulosic pulp with high intrinsic viscosity may comprise (a) contacting pulp and an aqueous alkaline hydroxide solution;
(b) adding a bridging agent to the mixture of pulp and aqueous alkaline hydroxide solution;
(c) heating the mixture;
(d) washing the pulp;
(e) neutralizing pulp to a pH ranging from 3 to 12; and
(f) recovering the high intrinsic viscosity pulp.

A method of making cellulosic pulp with high intrinsic viscosity may comprise

An activation stage comprising contacting the wood pulp with an aqueous solution of metal hydroxide for a specific period of time;

An intra-fiber bridging stage (cross-linking) comprising adding an aqueous solution of the cross-linking agent to the wood pulp suspension and heating the suspension at a temperature ranging from 30° C. to 100° C. for a period of time to produce the high intrinsic viscosity pulp;

Washing the pulp;

Neutralizing the pulp to a pH between 3 and 12; and

Drying the specialty pulp to a water content of 10% or less by weight.

After mixing the above-described components together, the pulp consistency is preferably not more than 15%, more preferably not more than 10%, and most preferably not higher than 8%. For example, the pulp consistency may be no more than 15%, 14%, 13%, 12%, 11%, 10%, 9%, 8%, 7%, 6%, 5%, or 4%. The pulp consistency may be no more than 10-15%, 8-15%, 5-15%, 8-10%, or 8-10%.

Preferably, the process of making the high intrinsic viscosity pulp of the present invention is carried out under heterogeneous reaction conditions; under these conditions cellulose is insoluble in the reaction mixture.

By varying the amounts of the pulp, the amounts of the bridging agent, and/or the conditions under which the bridged pulp is formed, a wide range of pulps with various IVs can be produced.

Activation Stage

The pulp first goes through an activation stage. In this stage, the pulp is treated with an aqueous solution of alkaline hydroxide. The alkaline hydroxide serves three purposes in the methods described herein: (1) it extracts residuals such as lignin and hemicellulose that may be left on the pulp after the pulping and bleaching processes; (2) it converts the hydroxyl groups in the cellulose chain into the highly reactive alkoxy form; and (3) treatment with alkaline hydroxide solution is capable of opening the crystalline region of the cellulose structure, rendering the hydroxyl groups more accessible to chemicals.

The aqueous solution of alkali hydroxide preferably has about 2% to 50% by weight, more preferably 4% to 25% by weight, and most preferably 6% to 16% by weight. Alkaline hydroxides suitable for use in the present invention include, but are not limited to, sodium hydroxide (NaOH), lithium hydroxide (LiOH), potassium hydroxide (KOH), and rubidium hydroxide (RbOH); benzyltrimethylammonium hydroxide (BTMOH); or any combination of thereof. The alkaline hydroxide can be added to the reaction mixture in solid form or in solution form; preferably in solution form. Sodium hydroxide is the preferred alkaline hydroxide of the present invention, and a 50% sodium hydroxide solution is most preferred.

The activation stage may be conducted in a temperature range of −10° C. to 80° C. Preferably, the activation stage is conducted in a temperature range of 5° C. to 50° C. For example, the activation stage may be conducted in a temperature range of 20° C. to 40° C. In particular, the activation stage may be conducted at a temperature of about 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., or 40° C.

The time required for the activation to be completed can range from 6 minutes to 4 hours. The activation step may be conducted for about 12 minutes to 2 hours.

After the activation stage, the pulp may be dewatered using a centrifuge and/or press, washed free of alkaline hydroxide but not neutralized, dewatered again to about 1.0 to 10% consistency, and then subjected to the treatment with the bridging stage.

Other reagents that enhance the reactivity of alkaline hydroxide with cellulose and act as a wedge (wedge agent) during the activation process may be used. Without being bound to a theory, it is believed in the art that the wedge agent appears to wedge open the cellulose fibers during the activation, rendering the hydroxyl group more accessible and more reactive. Examples of the wedge agents include, but are not limited to, urea and thiourea. Cellulose is known to swell in a solution of urea or thiourea and sodium hydroxide. The cellulose dissolves to form clear gel when the mixture is cooled down to a temperature below −5° C. An aqueous solution of wedge agent and alkaline hydroxide may be prepared prior to use in the activation stage. The wedge agent may be added to the reaction mixture in amounts within the range of 20 to 90% by weight of the pulp, more preferably not more than about 80%, more preferably not more than about 70%, and most preferably in the range of 40 to 70% by weight of the pulp.

Bridging Phase

The bridging agent may be added to the reaction mixture in amounts within the range from 0.1 to 20% by weight of the pulp; preferably not more than about 16%, more preferably not more than about 14%, and most preferably not more than about 12% by weight of the pulp. The bridging agent may be added to the reaction mixture in amounts within the range of 0.1% to 10%, 0.2% to 10%, 0.5% to 12%, 5% to 15%, 10% to 20%, or 3% to 12% by weight of the pulp. The bridging agent may be added to the reaction mixture in an amount not more than 20%, 19%, 18%, 17%, 16%, 15%, 14%, 13%, 12%, 11%, 10% by weight of the pulp.

During the course of the reaction with the bridging agent, the alkaline hydroxide concentration should preferably remain at the level of 4% to 16% by weight.

A bridging agent (cross-linking agent) containing at least two epoxy groups may be used to bridge two adjacent cellulosic chains within a single fiber (intra-bridging). An exemplary polyethylene glycol bridging agent may form dihydroxyalkoxy polyethylene glycol links that could be bonded from two sides to two cellulose chain as shown in FIG. 2A, or bonded from one side as shown in FIG. 2B, or bonded to the same cellulose chain as shown in FIG. 2C. Preferably, the dihydroxyalkoxy polyethylene glycol bridges two cellulosic chains to form a single fiber as shown in FIG. 2A. The bridging agent may be added to the pulp in amount that is effective for bridging 0.2% to 10% by weight of dihydroxyalkoxy polyethyleneglycol group on the pulp.

Organic polyfunctional bridging agents that may be used in the methods described herein include those terminated with at least two epoxy groups, e.g., polyglycidyl ethers. Suitable polyglycidyl ethers that may be used in the methods described herein include, but are not limited to: diglycidyl ether; ethylene glycol diglycidyl ether; glycerol triglycidyl ether; glycerol diglycidyl ether; glycerol propoxylate triglycidyl ether; 1,2-Propanediol diglycidyl ether; 1,4-Butanediyl diglycidyl ether; polyethylene glycol diglycidyl ether; propylene glycol glycidyl ether; polypropylene glycol diglycidyl ether; 1,4-cyclohexanoldimethanol diglycidyl ether; trimethylolethane triglycidyl ether; 1,2-cyclohexanoldimethanol diglycidyl ether diglycidyl, diglycidyl 1,2-cyclohexanedicarboxylate; resorcinol diglycidyl ether; Poly[(2-oxiranyl)-1,2-cyclohexanediol]-2-ethyl-2-(hydroxymethyl)-1,3-propanediol ether; 3,4-epoxycyclohexylmethyl-3,4-epoxycyclohexanecarboxylate; 4,4'-Methylenebis(N,N-diglycidylaniline); N,N-diglycidyl aniline, tris(4-hydroxyphenyl)methane triglycidyl ether; N,N-diglcidyl-4-glycidyloxyaniline; and diglycidyl 1,2,3,4-tetrahydrophthalate, 4,5-epoxycyclohexane-1,2-dicarboxylic acid diglycidyl ester.

Preferably the polyglycidyl ethers may contain two glycidyl ether groups. Polyglycidyl ethers that contain two glycidyl ether groups include, but are not limited to: diglycidyl ether; ethylene glycol diglycidyl ether; 1,2-Propanediol diglycidyl ether; 1,4-Butanediyl diglycidyl ether; polyethylene glycol diglycidyl ether; propylene glycol glycidyl ether; polypropylene glycol diglycidyl ether; 1,4-cyclohexanoldimethanol diglycidyl; 1,2-cyclohexanoldimethanol diglycidyl ether diglycidyl.

More preferably, the glycidyl ether used in the methods described herein are polyglycol-based diglycidyl ethers. Suitable polyglycol-based diglycidyl ethers include, but are not limited to, polyethylene glycol diglycidyl ether, ethylene glycol diglycidyl ether, and polypropylene glycol diglycidyl ether. Other glycidyl ethers that may be used in the methods described herein are water-soluble, glycol-based diglycidyl ethers, including, but not limited to, polyethylene glycol diglycidyl ether, diglycidyl ether, and ethylene glycol diglycidyl ether (EGDGE).

The bridging stage (cross-linking stage) is preferably carried out at a temperature within the range of 30° C. to 80° C. for up to 4 hours. Preferably, the bridging stage is carried out at a temperature within the range from 40° C. to 70° C. for about 2 hours. More preferably the bridging stage is carried out at a temperature within the range from about 40° C. to about 65° C. for about a period of time ranging from 0.5 to 3 hours. The time may range from about 0.05 to 4 hours, or, more preferably, from 0.1 to 3 hours.

The temperature of the suspension in the bridging stage may be increased by a gradual warming-up of the suspension or heating to the reaction temperature instantly. The reaction temperature as well as the reaction period will depend, in part, on the cross-linking agent, and those skilled in the art are capable of determining a suitable reaction temperature and time using the guidelines provided herein.

Generally, the activation and bridging stages according to the invention may be performed in various types of mixing equipment such as in containers provided with agitators or in rotating chambers. Preferably, the reaction is performed in containers equipped with an agitator in order to obtain the optimum mixing that leads to efficient reaction of pulp with the cross-linking reagents. Both stages may be performed in one containers or in two separate containers. For example, the activation step (a) and/or bridging step (b) can be performed in one reaction vessel or in two separate and distinct reaction vessels.

The bridging reaction preferably is carried out under an ambient atmospheric pressure; the reaction could be also carried out under an atmospheric pressure of inert gas such as nitrogen, argon, helium, neon, and carbon dioxide. However, the reaction also or optionally can be conducted under the impetus of pressure. The pressure usually can be anywhere from about 1 psi to 150 psi.

Proceeding now to a description of the drawings, FIG. 1 shows an exemplary series of steps for carrying out a method of the present invention.

Pulp 100 may be mixed with an alkaline solution 200 and heated to 35° C. for 40 minutes. A bridging agent (PEGDGE (Poly(ethylene glycol) diglycidyl ether) or EGDGE (ethylene glycol diglycidyl ether)) may be added to the solution in the reactor 300. The temperature of the reactor may be raised to 60° C. in 1 to 30 minutes and maintained at 60° C. for 60 minutes. Afterwards, the reaction system may be cooled down to room temperature (25° C.). The pulp may be collected by suction filtration (or centrifuge). The pulp may be washed 400 four times and neutralized by the addition of a dilute acetic acid 500. The pulp then may be dried 600 and recovered 700.

Any of the foregoing steps may be repeated. Further, the steps may be carried out in batch or continuous form. The high intrinsic viscosity pulp may then be used in the manufacture of cellulose ethers.

Pulp with High Intrinsic Viscosity

The methods described herein produce a pulp with high intrinsic viscosity. For example, the pulp may have an intrinsic viscosity of at least 20% higher than the starting pulp. The pulp may have a high molecular weight. Preferably, the weight average molecular weight (Mw) of the pulp of the present invention, as determined by size exclusion chromatography, is higher than 700 kDa. Preferably, the weight average molecular weight (Mw) of the pulp of the present invention is higher than 750 kDa.

Figure 3:
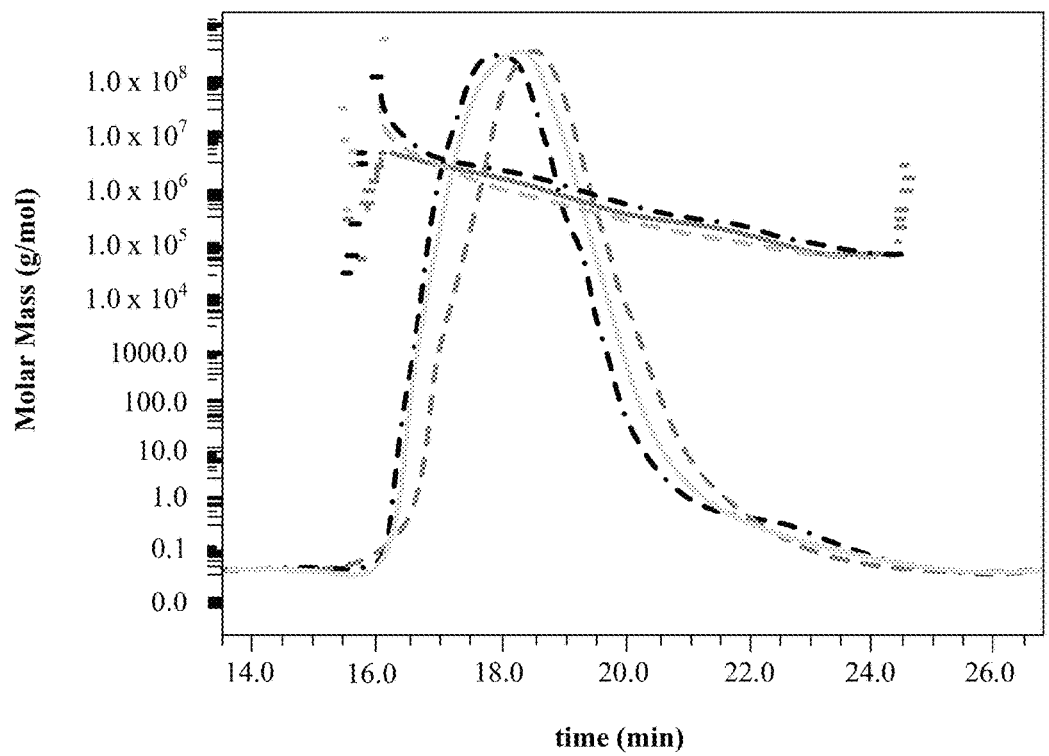
FIG. 3 depicts the molecular weight distribution based on elution time from a gel-permeating column for three pulp samples. Sample A (gray dashed line — —) was prepared using 1% bridging agent, 8% NaOH at 4% consistency. Sample B (dashed line with circles ● — —) was prepared using 2% bridging agent, 8% NaOH at 4% consistency. Sample C (solid gray line) was prepared using 4% bridging agent, 8% NaOH at 4% consistency.

The weight average may be determined by the HPLC/GPC method, and results for three samples of the pulp of the present invention are shown in FIG. 3. Size Exclusion Chromatography (SEC) was performed using GPC/HPLC combination; the HPLC (1260 infinity from Agilent) consisted of HPLC solvent degasser, Quaternary pump, injector, and a UV detector. The GPC detector was an 18-angle light-scattering detector, the DAWN® HELEOS® II (Wyatt Technology) and the Refractive Index detector Optilab® T-REX (Wyatt Technology). The data acquisition was carried out in 0.5-second intervals with the ASTRA6 software (Wyatt Technologies Corp.) The mobile phase 0.5% LiCl/DMAc was filtered through 0.25 μm pore filters Millex LCR (Millipore) prior to use.

The separation was carried out on a set of three columns that are connected on a series. The columns are 3× PLgel 10 μm MIXED-B, 300×7.5 mm (Agilent). They were placed in a heating compartment maintained at 25° C., and the system was operated at 25° C. with a flow rate of 1 mL/min. The mobile phase bottle was kept under a slight positive pressure of nitrogen gas. The injection volume was 100 and the run time was 40 minutes. Calibration was done by Wyatt technology with HPLC-grade toluene filtered with 0.02 μm filter Anotop 25. Normalization was carried out on-line (with the columns) with polystyrene 30,000 g/mol at 0.5016 g/mL in 0.5% LiCl/DMAc. The refractive index of 0.5% LiCl/DMAc was considered to be the same as that of DMAc (n=1.436). GPC analysis was performed on a sample of the pulp of the present invention with a concentration of 1.0 mg/mL prepared in a solution of 0.5% LiCl/DMAc. The dn/dc value (0.077 mL g-1) of cellulose solutions of 0.5% LiCl/DMAc used in the calculation of Mn and Mw, the dn/dc value was obtained from the literature. Dupont Mortha Journal of Chromatography A (2004) 1026(1): 129-141. Chromatograms of Mw distribution versus time are shown in FIG. 3, which shows the molecular weight distribution versus elution time for three pulp samples of the present invention. GPC analysis results obtained on three samples of specialty pulp are summarized in Table 1.

TABLE 1

GCP analysis results of three samples of the specialty pulp, prepared at various amounts of bridging agent

| Specialty Pulp | Mn (kDa) | Mw (kDa) | Polydispersity (Mw/Mn) |
|---|---|---|---|
| A | 217.4 | 532.8 | 2.5 |
| B | 253.6 | 734.6 | 2.9 |
| C | 335.8 | 787.0 | 2.3 |

The pulp with high intrinsic viscosity may be used to produce gel with a viscosity higher than 20,000 cp for 2% solution as measured by Brookfield viscometer using Spindle No. 6 at 10 RPM. The high intrinsic viscosity pulp made in accordance with the method described herein preferably has a fibrous structure identical to the cellulosic fiber from which it is derived.

The high intrinsic viscosity pulp prepared by the methods described herein may be used as a precursor for specialty polymer with important commercial applications such as cellulose ether. Cellulose ether made from pulp with high intrinsic viscosity is capable of producing clear solutions with high viscosity in water. Cellulose ethers may be made from the pulp with high intrinsic viscosity of the present invention and used as thickeners in paints, lubricants in oil and gas well drilling, in mining and in construction, pharmaceutical products, and food.

Starting Pulp

Any conventional pulp may be used as the starting pulp for the activation and bridging step of the methods described herein. For example, cellulosic material derived from hardwood, softwood, and other cellulose containing plant matter may be used in the methods described herein. Suitable wood pulp can be obtained from any of the conventional chemical processes, such as the Kraft and sulfite processes, with or without partial subsequent bleaching. The pulp may be obtained by a chemical, chemithermomechanical, thermomechanical, or mechanical process. For example, the pulp may be obtained by a chemical process, including, but not limited to, a Kraft, sulfite, or semichemical process.

Various softwood pulp may be used as the starting pulp in the methods described herein, including, but not limited to, Southern pine, White pine, Caribbean pine, Western hemlock, various spruces, including, but not limited to, Sitka Spruce, white spruce, Douglas fir, or mixtures thereof. Starting pulp may be obtained from hardwood pulp sources, including, but not limited to, gum, maple, oak, birch, *eucalyptus*, poplar, beech, and aspen, or mixtures thereof. Other cellulosic fiber derived from cotton linter, bagasse, Kemp, flax, and grass also may be used in the methods described herein. The starting pulp may be a mixture of two or more of the foregoing cellulose pulps. For example, wood pulp prepared by the Kraft and sulfite-pulping processes may be used in the methods described herein. Softwood pulps derived from a sulfite process are more preferred for use in the methods described herein. The softwood cellulose pulp may be Southern pine.

The pulp may be bleached after pulping, in part, to remove any residual lignin. For example, the bleaching may be by chemical bleaching methods known in the art.

The pulp may be in sheet form, roll form, fluff form, or mat form. The pulp may be in sheet or mat form.

Starting pulp may be in dry form or in never dried form. Preferably, the pulp used in the methods described herein is in never dried form. The pulp in a dry state may have a moisture content not higher than 12%. For example, fluff pulp in a dry state may have a moisture content not higher than 10%. Roll pulp or reel pulp in a dry state may have a moisture content not higher than 5-6%. For example, pulp in a dry state may have a moisture content not higher than 5%, 6%, 7%, 8%, 9%, 10%, 11%, or 12%.

Further Processing

After the activation phase and bridging phase, the pulp is typically neutralized with an acid. Acids suitable for use in this method, may be strong acids (e.g., hydrochloric acid, sulfur trioxide, and sulfuric acid) or weak acids (e.g., acetic acid.) The amount of acid used is the amount which is necessary to reach the desired pH. The neutralization may be performed using a diluted solution of acid preferably at 25%, more preferably at 15%, and most preferably at 10% of acid by weight. The neutralization may be performed using a diluted solution of acid preferably at 25%, 24%, 23%, 22%, 21%, 20%, 19%, 18%, 17%, 16%, 15%, 14%, 13%, 12%, 11%, or 10%. Preferably, the reaction mixture is neutralized to pH ranging from 3.0 to 12.0. For example, the reaction mixture may be neutralized to a pH ranging from 4.0 to 10.0; 6.0 to 12.0; 8.0 to 10.0; 3.0 to 10.0; or 5.0 to 11.0.

After washing and neutralization, the high intrinsic viscosity pulp preferably may then be dried and recovered using means known in the art so that the final water content of the product is less than 20% by weight, more preferably less than 10% by weight. For example, the dried high intrinsic viscosity pulp may have a final water content of less than 20%, 19%, 18%, 17%, 16%, 15%, 14%, 13%, 12%, 11%, 10%, 9%, 8%, 7%, 6%, or 5%.

Once dried, the bridged pulp may be sheeted or kept in bale form.

The methods described herein result in a number of advantages over known processes. For example, the methods described herein permit the production of high intrinsic viscosity pulp in an aqueous medium at low consistency with minimum side products. The high intrinsic viscosity pulp made in accordance with the present invention has a fibrous structure identical to the cellulosic fiber from which it is derived. The process of the present invention allows the production of high intrinsic viscosity pulp that produces water soluble cellulose ethers with high viscosity and low turbidity. The high intrinsic viscosity pulp made in accordance with the present invention preferably has a brightness of over 90%, α-cellulose content of not lower than 95%, and a bulk density not higher than 0.15 g/cc. For example, the high intrinsic viscosity pulp may have an α-cellulose content of not lower than 96%, 97%, 98%, or 99%. The high intrinsic viscosity pulp may have an α-cellulose content of not lower than 90%-99%, 96%-98%, 97%-98%, or 95%-99%. The high intrinsic viscosity pulp may have an α-cellulose content of not lower than 90%-99%.

Samples of high intrinsic viscosity pulp of the present invention have been converted into hydroxypropyl methyl cellulose (HPMC) and hydroxyethyl cellulose (HEC) as shown in Examples herein.

The inventors surprisingly discovered that by varying the selection and/or amounts of etherifying agent, and/or the conditions under which they are used, cellulose ethers can be produced which are capable, upon addition to an aqueous solution, of yielding gelled compositions with high viscosity and low content of insolubles. This was in contrast to the prior art, where cellulose ether with high viscosity and low content of insolubles can only be produced from cotton linter.

The viscosity and turbidity of the ether gels produced by dispersing the cellulose ethers made from the bridged pulp of the present invention in water depends on the following factors: (1) the amount of bridging agent used in making the pulp of the present invention; (2) the concentration of alkaline hydroxide used in making the pulp of the present invention; (3) the consistency, the activation temperature, and the bridging temperature during the process of making the bridged pulp; (4) the concentration of type and amount of etherifying agent. The effect of these factors can be seen clearly in the following Examples.

Preferably, the viscosity of an aqueous solution containing 1.9% by weight of the cellulose ether made from the cross-linked pulp of the present invention is not lower than 10000 cp, at 20° C., preferably not lower than 15,000 cp, and most preferably not lower than 25,000 cp (Brookfield spindle No. 6, 10 rpm).

Further embodiments of the present invention will now be described with reference to the following examples. The examples contained herein are offered by way of illustration and not by any way of limitation.

EXAMPLES

Example 1

Preparation of High IV Pulp

Activation Stage:

A sample of Ethenier-HV (1.0 Kg, oven dried weight, it is a fully bleached pulp produced by Rayonier Advanced Materials at the Fernandina Plant (located in Fernandina Beach, Fla.) was loaded in a 5 liter reactor. A caustic solution (NaOH 8 wt % in water) was added to the reactor to produce a suspension with 4% consistency. The suspension temperature was about 35° C. The suspension was mixed at 35° C. for about 15 minutes Bridging Stage:

An aqueous solution of PEGDGE (Poly(ethylene glycol) diglycidyl ether) or EGDGE (ethylene glycol diglycidyl ether) was added to the solution in the reactor. Then the temperature of the reactor was raised to 50° C. in 5 minutes and maintained at 50° C. for 40 minutes. Afterwards, the reaction system was cooled down to room temperature (25° C.). The pulp was collected by suction filtration (or centrifuge, 10,000 rpm for 10 minutes using a Fletcher/Sharples 14"×6" Fletcher Perforated Basket Centrifuge, Size 14, Philadelphia) and washed with water (four times) to remove caustic, unreacted reagents and side products. Produced pulp in the third washing was neutralized with diluted acetic acid (10% by weight in water) to pH between 4.0 and 10.5.

Seven samples were prepared using this method at same consistency, caustic concentrations, activation temperatures and bridging temperatures. Different bridging agent concentrations and types were used.

TABLE 2

High intrinsic viscosity pulps prepared using
various amounts of bridging agent PEGDGE

| Sample No. | Consistency (g pulp/ 100 g mixture) | Caustic (g/100 g water) | Activation temperature (° C.) | Cross-linking agent (g/100 g pulp) | Cross-linking temperature (° C.) | Cross-linking time (min) |
|---|---|---|---|---|---|---|
| 1 | 4 | 8 | 30 | 2 | 50 | 40 |
| 2 | 4 | 8 | 30 | 4 | 50 | 40 |
| 3 | 4 | 8 | 30 | 6 | 50 | 40 |
| 4 | 4 | 8 | 30 | 8 | 50 | 40 |

TABLE 3

High intrinsic viscosity pulps prepared using various
amounts of bridging agent EGDGE.

| Sample No. | Consistency (g pulp/ 100 g mixture) | Caustic (g/100 g water) | Activation temperature (° C.) | Cross-linking agent (g/100 g pulp) | Cross-linking temperature (° C.) | Cross-linking time (min) |
|---|---|---|---|---|---|---|
| 5 | 4 | 8 | 30 | 2 | 50 | 40 |
| 6 | 4 | 8 | 30 | 4 | 50 | 40 |
| 7 | 4 | 8 | 30 | 6 | 50 | 40 |

Scanning Electron Microscopy (SEM) was performed on the specialty pulp of the present invention using TM-1000 (Hitachi, Pleasanton, Calif.). A small amount of pulp was mounted on the SEM sample stage with a conductive carbon tape attached and the surface morphology of the pulp was observed. Obtained images are shown in FIG. 4. A shown in FIG. 4, Ethenier-HV (FIG. 4A) which is the base pulp has fibers with flat ribbon type of shape, while the fibers of the specialty pulp is twisted and curled (FIG. 4A—SP1 and 4B—SP2). An indication that the specialty pulp of the present invention is bridged of the present invention.

Example 2

Preparation of Hydroxy Ethyl Cellulose (HEC) from High Intrinsic Viscosity Pulp of the Present Invention Samples of bridged pulps of the present invention made in Samples #1-7 Example 1 were ground through a 200 μm screen using Wiley mill (45.0 g oven dried weight, 0.28 mol of anhydroglucose repeat unit) and introduced into a 2 liter horizontal Parr reactor. The reactor was purged four times with nitrogen, followed by evacuating the reactor. After removing air completely from the reactor, isopropyl alcohol (180 g) was added to the pulp from a sample cylinder with agitation under vacuum conditions. Then caustic (17.5%, 61.6 g, 0.79 mol, 1.0 mol/1 mol of anhydroglucose repeat unit) was added slowly to the pulp with agitation under vacuum conditions. After the addition of sodium hydroxide was complete, pulp was soaked with agitation for 40 minutes at room temperature (25° C.). The etherification reagent ethylene oxide (33.6 g, 0.27 mol, 0.94 mol/1 mol of anhydroglucose repeat unit) was then added. The reaction mixture was heated in 120 minutes from room temperature to 60° C. and maintained at 60° C. for 1 hour, then cooled to room temperature (25° C.). The product was removed from the reactor and washed sequentially with a 0.5 L solution of 20% by volume of water and 4% by volume of acetic acid in isopropyl alcohol, two times with 0.5 L solution of 20% by volume of water in isopropyl alcohol, and finally with acetone to free the product from sodium acetate salt. Each washing was performed by adding the washing solution to HEC in a 2.0 L beaker. The mixture was stirred using a mechanical mixer for at least 15 minutes, then solvent was removed by suction filtration. HEC product was then dried in an oven at 80° C. The product was analyzed for viscosity, turbidity, and insolubility.

Test Methods

To evaluate the various attributes of the present invention, tests were performed to characterize the high intrinsic viscosity pulps made by the methods described herein and the cellulose ethers made from thereof.

Viscosity

A sample of the prepared cellulose ether hydroxy ethyl cellulose (HEC) was ground using the Wiley mill through a 0.5 mm screen. A solution (1.9%) of cellulose ether was then prepared by adding 3.8 g of ground cellulose ether to 196.2 g of distilled water. The mixture was cooled slowly to room temperature and stirred mechanically for 2 hours at room temperature (25° C.) to produce a clear gel. The viscosity of the produced gel was measured using a Brookfield viscometer DV-II+ Pro EXTRA (Middleboro, Mass.; spindle 6, 20 rpm, 22° C.).

Insoluble

A sample of 2% by weight of cellulose ether gel in water (20.0 g) was diluted with distilled water to 100.0 g. The mixture was stirred for 20 minutes and centrifuged at 5,000 RPM for 10 minutes. The centrifuge was performed using the bench top Eppendorf centrifuge (rotor: 6×60/30 mL, 16F6-28; Eppendorf Belgium N.V./S.A, Beglium). The solution was decanted and the residue was washed with distilled water (100 g), stirred, centrifuged at 5000 rpm for 10 minutes (bench top Eppendorf centrifuge (rotor: 6×60/30 mL, 16F6-28; Eppendorf Belgium N.V./S.A, Belgium), and decanted. The washing procedure was repeated twice. The residue was dried at 105° C. for about 2 hours and weighed.

Turbidity

The turbidity was measured optically for 1.9% solution using a turbidimeter Ration XR (by HACH, Loveland, Colo.).

TABLE 4

Analysis results of HEC samples prepared from high intrinsic viscosity pulp bridged with PEGDGE.

| High I.V. pulp sample | Viscosity (cp) 1.9% solution (Spindle 6 speed 10) | Turbidity (NTU) | Insoluble (%) | Yellowness |
|---|---|---|---|---|
| Control | 18,500 | 9.75 | 2.4 | 3.53 |
| 1 | 37,100 | 6.1 | 2.0 | 3.15 |
| 2 | 48,100 | 5.3 | 2.3 | 3.32 |
| 3 | 61,000 | 6.8 | 3.1 | 3.14 |
| 4 | 68,000 | 10.2 | 4.9 | 3.21 |

Control: Ethenier-HV produced by Rayonier Advanced Materials at Fernandina Plant using the sulfite process. (I.V. cuene 11.18 d/g, Iso brightness 90%, Dichloromethane extracts 0.02%, S10-S18 0.8%). The yellowness was measured according to the ASTM D1925 method. Detailed procedure is shown above

TABLE 5

Analysis results of HEC samples prepared from high IV pulp bridged with EGDGE.

| High IV pulp sample | Viscosity (cp) 1.9% solution (Spindle 6 speed 10) | Turbidity (NTU) | Insoluble (%) | Yellowness |
|---|---|---|---|---|
| 5 | 52,300 | 3.66 | 1.65 | 3.22 |
| 6 | 84,000 | 5.84 | 2.80 | 3.43 |
| 7 | 96,100 | 6.18 | 3.12 | 3.36 |

Control: Ethenier-HV produced by Rayonier Advanced Materials at Fernandina Plant using the sulfite process.

Example 3

Preparation of Hydroxypropyl Methylcellulose (HPMC)

Samples of high intrinsic viscosity (IV) pulp of the present invention made in Example 1 were ground through a 0.5 mm screen using Wiley mill (45.0 g oven dried weight, 0.28 mol of anhydroglucose repeat unit) and introduced into a 2 liter horizontal Parr reactor. The reactor was purged five times with nitrogen, followed by evacuating the reactor to reduce the oxygen levels to 1 ppm or less. Caustic (50%, 75 g, 0.938 mol, 3.35 mol/1 mol of anhydroglucose repeating unit) was slowly added to the pulp through tubing from a sample cylinder. The addition of NaOH was performed in three stages with a 10-minute mixing after each stage. After the addition of sodium hydroxide was complete, pulp was soaked with mixing for 30 min. The etherification reagent propylene oxide (7.5 g, 0.13 mol, 0.46 mol/1 mol of anhydroglucose repeating unit) was first added, then chloromethane (66.0 g, 1.31 mol, 4.64 mol/1 mol of anhydroglucose repeating unit). The reaction mixture was heated from room temperature to 80° C. in about 110 minutes and maintained at 80° C. for 70 minutes. At the end of the etherification process the product was removed from the reactor and washed sequentially with a hot solution (>90° C.) of sodium chloride (5%) and hot water (2 liters, 90° C.) to free the product from salt and unreacted sodium hydroxide. It was then dried and analyzed for viscosity, turbidity, and yellowness.

TABLE 6

Analysis results of HPMC samples prepared form high intrinsic viscosity pulp bridged with PEGDGE

| Cross-linked Pulp sample | Viscosity (cp) 1.9% solution (Spindle 6 speed 10) | Turbidity | Insoluble (%) | Yellowness |
|---|---|---|---|---|
| Control | 16,100 | 8.36 | 3.3 | 3.61 |
| Cotton linter | 88,200 | 49.7 | 9.7 | 3.04 |
| 1 | 71,500 | 13.2 | 6.2 | 3.32 |
| 4 | 76,000 | 22.4 | 8.1 | 3.51 |

Control: Ethenier-HV produced by Rayonier Advanced Materials at Fernandina Plant using the sulfite process.

TABLE 7

Analysis results of HPMC samples prepared form high IV pulp bridged with EGDGE

| Cross-linked Pulp sample | Viscosity (cp) 1.9% solution (Spindle 6 speed 10) | Turbidity | Insoluble (%) | Yellowness |
|---|---|---|---|---|
| Control | 16,100 | 8.36 | 3.3 | 3.61 |
| Cotton linter | 88,200 | 49.7 | 9.7 | 3.04 |
| 5 | 55,600 | 13.6 | 4.8 | 3.44 |
| 6 | 87,200 | 16.1 | 6.8 | 3.48 |
| 7 | 157,000* | 18.2 | 6.3 | 3.52 |

Control: Ethenier-HV produced by Rayonier Advanced Materials at Fernandina Plant using the sulfite process.
*In this run spindle 6 was used at 5.0 rpm. At 10.0 rpm, the measurement was over scale.

The results summarized in Tables 4 to 7 show that, cellulose ethers made from the specialty pulp of the present invention dissolve in water at room temperature to produce a clear gel with high viscosity and low content of insolubles, yellowness and turbidity. For instance hydroxypropyl methylcellulose (sample 7, Table 6) when dissolves in water at 1.9 wt % concentration produces gel with a viscosity of about $157 \times 10^3$ cp. The viscosity could be the highest reported in the literature for cellulose ether. The value is higher than that for HPMC made from the base pulp Ethenier-HV (I.V. cuene 11.2) and that made form cotton linter (I.V. cuene=17) at the same concentration (88,200 cp). For example, cotton linters used to make HPMC, produced HPMC at 2 wt % in water showed a viscosity of 92,000 cp (Spindle 4, 30 rpm). See U.S. Pat. No. 8,173,799.

Thus, the inventors surprisingly discovered that the combination of reacting cellulosic pulp with an alkaline hydroxide and treatment with a bridging agent, e.g., single-step process, provided an unexpected improvement in the product quality of specialty fiber with high intrinsic viscosity. This single-step process is surprisingly superior to multistep processes, e.g., two-step processes. This fiber, in contrast to prior art methods of treating cellulosic pulp, was surprisingly more readily converted into cellulose ethers.

Although certain manufacturers, model names and numbers are given for machinery used in the invention, other machinery may be substituted, as would be appreciated by those skilled in the art.

Although certain ranges are provided for the humidity, temperature, conveyor speed, and air flow characteristics, these can be varied based on the particular volumes desired, space requirements and other needs. After reading this specification, one skilled in the art will understand that the selection of working or optimum numbers for these variables may be made once the plant and overall process parameters of a particular processing installation are known.

Although the invention has been described in some detail by way of illustration and example for purposes of clarity of understanding, it should be understood that certain changes and modifications may be practiced within the scope of the appended claims. Modifications of the above-described modes for carrying out the invention that would be understood in view of the foregoing disclosure or made apparent with routine practice or implementation of the invention to persons of skill in chemistry, paper and pulp processing, chemical engineering, and/or related fields are intended to be within the scope of the following claims.

All publications (e.g., Non-Patent Literature), patents, patent application publications, and patent applications mentioned in this specification are indicative of the level of skill of those skilled in the art to which this invention pertains. All such publications (e.g., Non-Patent Literature), patents, patent application publications, and patent applications are herein incorporated by reference to the same extent as if each individual publication, patent, patent application publication, or patent application was specifically and individually indicated to be incorporated by reference.

While the foregoing invention has been described in connection with this preferred embodiment, it is not to be limited thereby but is to be limited solely by the scope of the claims which follow.

The invention claimed is:

1. A method of making a specialty pulp comprising:
   (a) an activation step comprising contacting a pulp with an aqueous solution comprising 2 to 16 wt % of alkaline hydroxide to form an aqueous suspension of an alkali cellulose pulp; and
   (b) a bridging step comprising adding a bridging agent to the aqueous suspension of the alkali cellulose pulp comprising 2 to 16 wt % of alkaline hydroxide, and reacting the aqueous suspension of the alkali cellulose pulp with the bridging agent at a temperature range of 30° C. to 80° C., to obtain an aqueous suspension comprising the pulp crosslinked with the bridging agent,
   wherein the bridging agent consists essentially of a water-soluble organic polyfunctional compound having at least two epoxy groups,
   wherein water is the sole solvent in the aqueous solution and the aqueous suspension, and
   wherein the aqueous suspension in the bridging step (b) consists essentially of the alkaline hydroxide, the alkali cellulose pulp, and the bridging agent,
   to obtain the water soluble specialty pulp.

2. The method of claim 1, wherein the pulp is derived from hardwood cellulose pulp, softwood cellulose pulp, cotton linters, bagasse, hemp, flax, grass, or mixtures thereof.

3. The method of claim 2, wherein the pulp is softwood cellulose pulp or hardwood cellulose pulp.

4. The method of claim 1, wherein the pulp is bleached.

5. The method of claim 1, wherein the pulp is in a sheet form, roll pulp form, mat form, or fluff form.

6. The method of claim 1, wherein the pulp is provided in dry or wet state.

7. The method of claim 6, wherein the dry pulp is in a never dried state.

8. The method of claim 1, wherein the alkaline hydroxide is sodium hydroxide (NaOH), lithium hydroxide (LiOH), potassium hydroxide (KOH), rubidium hydroxide (RbOH), benzyltrimethylammonium hydroxide (BTMOH), or mixtures thereof.

9. The method of claim 8, wherein the alkaline hydroxide solution comprises about 8 wt % of alkaline hydroxide.

10. The method of claim 1, wherein the aqueous solution further comprises a wedging agent at a concentration of about 2 to 100% by weight relative to the amount of the pulp.

11. The method of claim 10, wherein the wedging agent is at a concentration of about 4%-8% by weight of the pulp.

12. The method of claim 11, wherein the wedging agent is urea, thiourea, or a mixture thereof.

13. The method of claim 1, wherein step (a) is conducted for 1 minute to 150 minutes.

14. The method of claim 1, wherein step (a) is conducted at a temperature of −5° C. to 70° C.

15. The method of claim 1, wherein the bridging agent is a polyglycidyl ether.

16. The method of claim 15, wherein the polyglycidyl ether is diglycidyl ether; ethylene glycol diglycidyl ether; glycerol diglycidyl ether; 1,2-Propanediol diglycidyl ether; 1,4-Butanediyl diglycidyl ether; polyethylene glycol diglycidyl ether; propylene glycol glycidyl ether; polypropylene glycol diglycidyl ether; 1,4-cyclohexanoldimethanol diglycidyl ether; 1,2-cyclohexanoldimethanol diglycidyl ether, diglycidyl 1,2-cyclohexanedicarboxylate; resorcinol diglycidyl ether; 4,4'-Methylenebis(N,N-diglycidylaniline); N,N-diglycidyl aniline, N,N-diglcidyl-4-glycidyloxyaniline; diglycidyl 1,2,3,4-tetrahydrophthalate, 1,2-dicarboxylic acid diglycidyl ester, or a mixture thereof.

17. The method of 1, wherein the bridging agent is a polyglycol-based diglycidyl ether.

18. The method of claim 17, wherein the polyglycol-based diglycidyl ether is polyethylene glycol diglycidyl ether, ethylene glycol diglycidyl ether, polypropylene glycol diglycidyl ether, or a combination thereof.

19. The method of claim 1, wherein the bridging agent is added to the pulp in an amount of 0.1% to 20% based on the pulp weight.

20. The method of claim 1, wherein step (b) is conducted for about 2 minutes to 6 hours.

21. The method of claim 1, wherein step (b) is conducted using an atmosphere comprising an inert gas.

22. The method of claim 1, further comprising recovering the specialty pulp after the bridging step.

23. The method of claim 22, further comprising washing the specialty pulp.

24. The method of claim 22, further comprising adding an acid solution to neutralize the specialty pulp.

25. The method of claim 22, further comprising drying the specialty pulp.

26. The method of claim 1, wherein the specialty pulp has a weight average molecular weight of greater than 700 kDa and an α-cellulose content of 90% or more.

27. The method of claim 1, wherein the specialty pulp is used to make a cellulose ether having an intrinsic viscosity of at least 1.2 times higher than the intrinsic viscosity of the pulp.

28. A method of making a specialty pulp consisting essentially of the steps of:
   (a) an activation step comprising contacting a pulp with an aqueous solution comprising 2 to 16 wt % of alkaline hydroxide to form an aqueous suspension of an alkali cellulose pulp;
   (b) a bridging step comprising reacting the aqueous suspension of the alkali cellulose pulp with a bridging agent at a temperature range of 30° C. to 80° C., to obtain an aqueous suspension comprising the pulp crosslinked with the bridging agent, wherein the activation step (a) and the bridging step (b) are conducted at the same time, wherein the bridging agent consists essentially of a water-soluble organic polyfunctional compound having at least two epoxy groups, wherein water is the sole solvent in the aqueous solution and the aqueous suspension, and wherein the aqueous suspension consists essentially of the alkaline hydroxide, the alkali cellulose pulp, and the bridging agent, to obtain the water soluble specialty pulp, (c) washing the specialty pulp,
(d) neutralizing the specialty pulp,
(e) recovering the specialty pulp, and
(f) drying the specialty pulp.

* * * * *